March 8, 1960

D. R. SAND 2,927,673

ENERGY TRANSMITTING DEVICE

Filed April 19, 1956

INVENTOR.
DARREL R. SAND
BY
HIS ATTORNEY

March 8, 1960
D. R. SAND
2,927,673
ENERGY TRANSMITTING DEVICE
Filed April 19, 1956
2 Sheets-Sheet 2
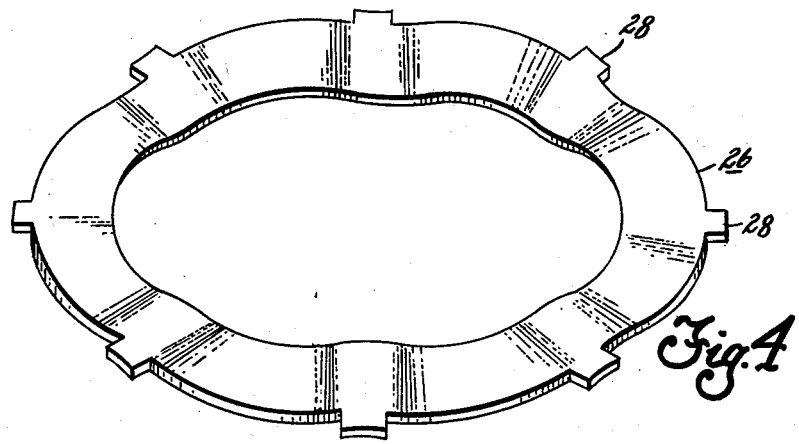
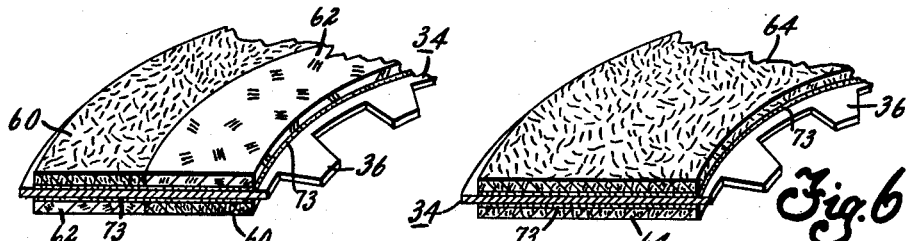
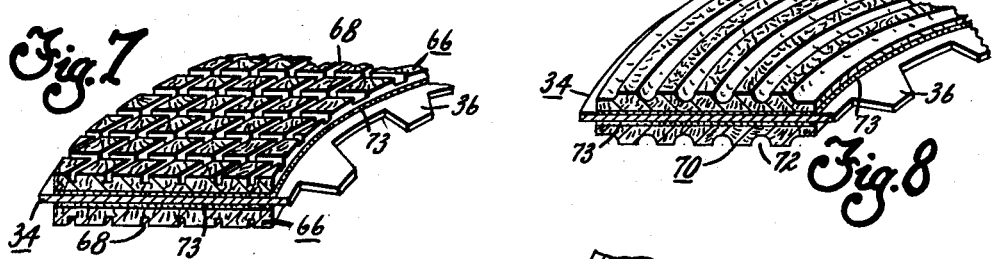
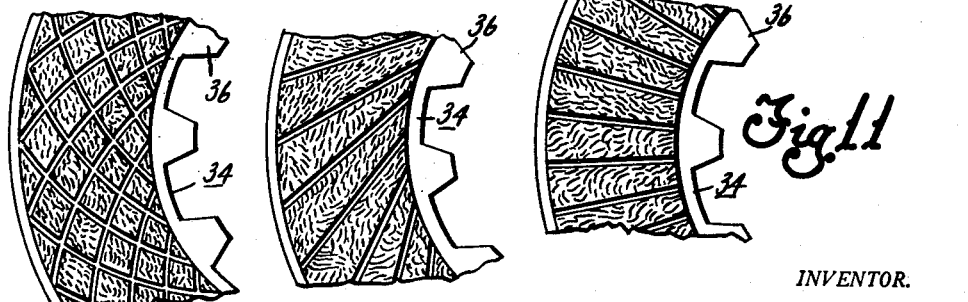
INVENTOR.
DARREL R. SAND
BY
HIS ATTORNEY United States Patent Office 2,927,673
Patented Mar. 8, 1960

2,927,673
ENERGY TRANSMITTING DEVICE

Darrel R. Sand, Plymouth, Mich., assignor to General Motors Corporation, Detroit, Mich., a corporation of Delaware Application April 19, 1956, Serial No. 579,331

6 Claims. (Cl. 192—69)

This invention relates to multiple plate friction devices, such as energy transmitting devices, and is particularly concerned with a novel combination of friction plates for use therein.

It is one object of the invention to provide a friction plate assembly for use in energy transmitting mechanisms, such as energy absorbing (brakes) or torque transmitting (clutches) devices, wherein a plurality of friction plates are used and wherein alternate plates are keyed together and are waved, said waved plates being nested so that all undulations thereof are aligned with similar undulations in the other waved plates.

In carrying out this object it is a further object of the invention to provide for a transmission assembly including two sets of plates which operate as two units, the first set of plates being flat and the second set of plates being identically waved or undulated, said sets of plates being arranged in alternate relation in the assembly so that each waved plate is adjacent a flat plate and wherein all of the waved plates are assembled in a nested or aligned position so that all hills and all valleys of the waved plates are in axial alignment.

A still further object of the invention is to provide a transmission assembly wherein two alternate sets of plates are used, one of which is a driving set and the other of which is a driven set and wherein one of said sets of plates comprises waved plates which are nested or aligned position with respect to one another in the axial direction, said waved plates being generally less conformable than the flat plates whereby upon engagement of the clutch pack greater torque carrying capacity is obtained.

A still further object of the invention is to provide a transmission assembly comprising a clutch pack which has greater torque capacity, longer life and which is smoother in operation than prior art assemblies of the general character described.

Further objects and advantages of the present invention will be apparent from the following description, reference being had to the accompanying drawings, wherein preferred forms of the invention are clearly shown.

In the drawings:

Figures 1 through 3 are diagrammatic views of a transmission assembly including a clutch pack showing the pack in various stages of operation wherein Figure 1 shows the pack fully disengaged, Figure 2 shows the pack partially engaged or at the start of engagement, and Figure 3 shows the pack fully engaged wherein the driving and driven members are operating substantially as a unit.

Figure 4 is a view of one of the waved plates.

Figure 5 is a fragmentary view in perspective of one type of flat faced plate.

Figure 6 is a view similar to Figure 5 showing another type of faced plate.

Figures 7 through 11 are additional views similar to Figure 5 showing faced plates having various types of grooving configurations in the surfaces of the facings.

In copending applications, Ser. No. 386,976, Ser. No. 392,596, now Pat. No. 2,733,797, and Ser. No. 503,466, all assigned to the assignee of the present invention, transmissions are shown which include friction plate assemblies wherein one of the sets of plates, namely the driving or driven set, has a facing on one or both sides thereof to enhance the frictional characteristics thereof and wherein waved plates and flat plates are alternately disposed in the clutch pack thereof.

The present invention is directed to a somewhat similar type of energy transmitting device as disclosed in said applications and is concerned mainly with a novel arrangement of the several friction plates used therein together with the disposition of such plates within the friction plate assembly. In said copending applications it is usual practice to provide alternate plates, either waved or coned, interposed between flat plates wherein one set of plates includes facings on one or both sides thereof. In all of these applications the waved plates and the flat plates are assembled by placing them indiscriminately within the transmission with respect to the wave pattern thereon. In other words, while the waved plates are all identical as manufactured, they are assembled at random and without regard for the position thereof so far as nesting of the plates is concerned. In fact, this indiscriminate disposition of the waved plates was believed to yield a more resilient clutch pack which had good torque carrying capacity and was better cushioned and smoother in operation.

The present invention is directed to an entirely different approach to the problem of obtaining good torque carrying capacity in a pack including waved and unwaved plates. In this case the waved plates are aligned so that all hills and all valleys, namely the undulations therein, are axially aligned. The plates are preferably made of varying thicknesses of steel or of different degrees of resilience or conformability so that upon engagement thereof the flat plates, which are generally thinner and/or more conformable, tend to conform initially to the wave pattern of the adjacent plates whereby it has been found that greater torque carrying capacity is obtained with equally as smooth operation and with the added feature of longer life. These factors increase the torque capacity of the pack by as much as 18% over a similar clutch pack tested under the same conditions wherein the waved plates were indiscriminately assembled with respect to the undulations thereof.

Figure 1:
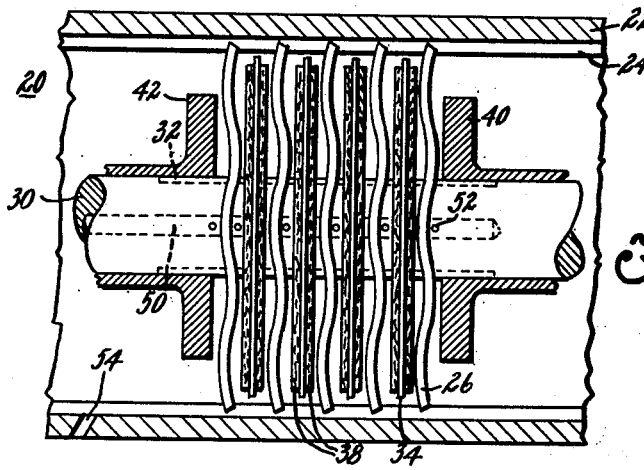
Figure 2:
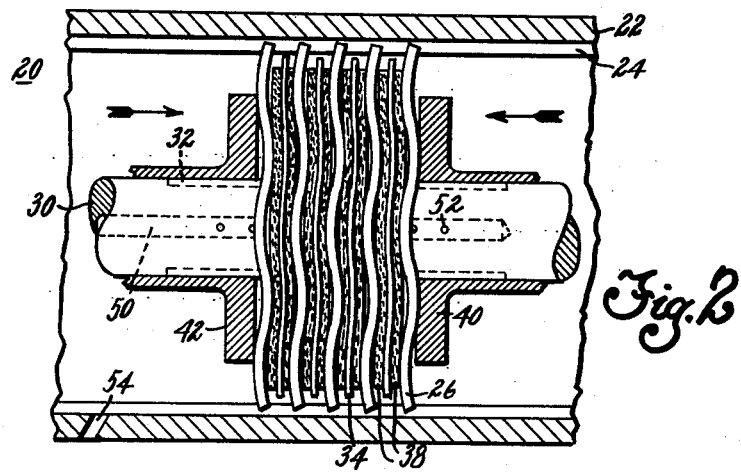
Figure 3:
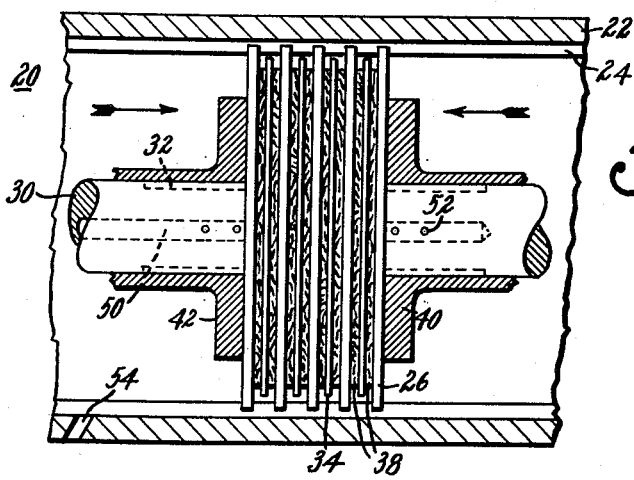

Referring specifically to the drawings, Figures 1 through 3 show diagrammatically a clutch pack at 20 wherein 22 is a driven member having internal splines or slots 24 running axially thereof. Carried by these spline slots are a plurality of driven plates 26 shown in detail in Figure 4. The driven plates 26 are undulated or waved in shape and are assembled in the driven member 22 in complete alignment with one another with respect to the undulations thereof. The waved plates 26 include at their outer peripheries a plurality of keys or outboard splines 28 which fit slidably within the spline slots 24. It is apparent that the number of keys 28 depends entirely upon the number of spline slots 24 that are provided. Thus, the driven plates 26 rotate as a unit with the driven member 22.

Passing through the driven plates 26 is a shaft or driving member 30. This shaft is also splined at 32 and receives thereon a plurality of driving plates 34. In this instance, the driving plates 34 are splined internally at 36. The splines 36 correspond in number and fit into the spline slots 32 on the shaft 30. Thus, the driving plates 34 rotate as a unit with the shaft 30. The driving plates 34, for purposes of explanation, are preferably faced with suitable facing material 38 which may take many forms as will be described hereinafter and which forms no part of this invention.

Slidably mounted around the shaft 30 are a pair of opposed pressure members 40 and 42 which are actuated by pressure means, not shown, to move toward one another when desired. A fluid, for example, a transmission oil is pumped by a pump, not shown, through a duct 50 in the shaft 30 and is exhausted through connecting ducts 52 therealong between the several plates of the assembly. The oil returns through a return duct indicated at 54 to the pumping system.

In operation of the device, when the transmission is in disengaged position, the plates are as shown in Figure 1 wherein the plates may or may not touch one another and the pressure members 40 and 42 are out of substantial contact with the plates. When it is desired to engage the transmission, pressure means, not shown, cause the members 40 and 42 to initially move toward one another in the direction of the arrows shown in Figure 2. In this position, the waved plates indicated at 26 are flattened to a degree while the normally unwaved plates 34 become slightly undulated to conform to some degree to the shape of the waved plates 26. This condition is shown in Figure 2. As the pressure members 40 and 42 continue to move toward one another, the plate assembly is substantially flattened as shown in Figure 3 at which time the plates are in maximum engagement and the driven member 22 moves substantially as a unit with the driving member 30 during operation of the transmission. In the driving position the pressure members 40 and 42 remain as shown in Figure 3. When it is desired to disengage the unit, the pressure means is released and the pressure members 40 and 42 retract to a position substantially as shown in Figure 1 at which time the driving and driven plates are disengaged.

One feature which contributes to the success of this invention is directed to the conformability of the plates used. In this connection different thicknesses of metal may be used wherein, for example, the driven plates 26 which are waved are made of steel approximately .070 inch thick whereas the driving plates 34 are made of steel of from .035 to .060 inch thick. These dimensions are suitable with respect to plates having an average diameter of about 5 11/32 inches. It is apparent that as the diameter of the plates increases, the thicknesses thereof should usually increase whereas if the diameter of the plates decreases, the thickness thereof should usually decrease for similar operational characteristics. It is apparent that in the assembly shown, the disposition of driving and driven plates may be reversed if desired. However, the particular disposition shown is the preferred form. In most cases the thickness of the plates may be the same providing the waved plates 26 are of the greatest diameter. For example, the driven plates 26 are provided with outboard splines 28 which brings the diameter to about 6" while the driving plates 34 are flat and are provided with inboard splines so that the outer diameter is only about 5 5/16 inches. In this connection, both sets of plates have the same area of friction surface. However, the conformability of the plates differs with the smaller diameter flat plate being more conformable than the larger diameter waved plate. For these reasons, the basis for determination of the thickness of steel to be used should be based upon the characteristics desired.

In order to further control the friction characteristics of the transmission, one set of plates may be faced, for example, the plates 34. These facings may be as shown in Figure 5 wherein alternate rings of fibrous material 60 and cork 62 are used in opposed relation on opposite sides of the plate. In Figure 6 fibrous facings 64 are shown on both sides of the plate without the cork. In Figure 7 fibrous facings 66 having waffle grooved design impressed therein at 68 may be used whereas in Figure 8 a facing 70 is shown having a spiral groove 72 cut therein. Figures 9, 10 and 11 show facing material having other types of grooving, for example, in Figure 9 a waffle grooving wherein the cross grooves are curved as shown, in Figure 10 the grooves are tangential to a circle of less diameter than the inner diameter of the plate, whereas in Figure 11 the grooves are radial in character. The various facings are attached by a layer 73 of suitable cement.

The specific material used in the facing has considerable bearing on the capacity and operational characteristics of the assembly. However, such materials do not form any basis for this invention and any suitable facing material may be used. Some of these materials for use in a clutch are disclosed in copending application Ser. No. 386,976 while suitable brake facings are shown in copending application Ser. No. 550,107 assigned to the assignee of this invention. The facing may also be of semi-metallic nature wherein a fibrous material bonded with a resinous binder and including substantial quantities of metal powder dispersed therethrough may be used, or the facing may be metallic in character, for example, as made from sintered metal powders bonded directly to the steel plate. Such facings are clearly disclosed in Wellman Patent No. 2,178,525, and copending application, Ser. No. 540,842 assigned to the assignee of this invention. In some instances all of the plates may be faced on one side only as disclosed in copending application Ser. No. 503,466. In this case, alternate plates are waved and are driven while the matching set is flat and is the driving group.

The grooving of the plate surface is also important in that the grooving controls to a large extent the elimination of the transmission oil from between the plates and by varying such grooving it is possible to obtain quicker engagement, more cushioning effect, etc., as desired. This grooving also is well known in the art and forms no part of this invention. While the description herein has been directed to transmission assemblies, it is quite apparent that a similar friction plate assembly may be used as a brake wherein one set of plates is stationary and the other set of plates is operatively attached to a rotating member which is to be stopped or varied in its rate of rotation. Of course, when the assembly is used as a brake, facings having high heat resistance should be used. In this case, metal friction linings or facings are particularly desirable although if sufficient fluid is pumped between the plates during engagement thereof, non-metallic or semi-metallic facings can be used depending upon the specific application and characteristics of operation thereof.

While the forms of embodiment of the invention as herein disclosed constitute preferred forms, it is to be understood that other forms might be adopted, as may come within the scope of the claims which follow.

What is claimed is as follows:

1. In a clutch pack for use in an automatic transmission comprising a plurality of alternating flat plates and at least four waved plates wherein all flat plates operate as a unit and wherein all waved plates operate as another unit, all of said waved plates being disposed in nested relation to one another so that all undulations therein are axially aligned, said alternate flat and waved plates being relatively rotatable with respect to one another.

2. The clutch pack claimed in claim 1 wherein at least one set of plates includes a friction surface on each plate which is engageable with the next adjacent plate.

3. An energy transmitting device, comprising in combination; two sets of aligned plates in alternately disposed relation, one set of plates being flat and operating as a unit and the other set of plates including at least four plates being waved and operating as a unit, all of said waved plates being disposed in nested relation to one another so that all undulations therein are axially aligned, said two sets of plates being relatively and coaxially rotatable with respect to one another, one of said sets of plates doing the driving and the other of said set of plates being driven, and means for compressing said plates axially for placing the plates in energy transmitting relation to one another.

4. An energy transmitting device, comprising in combination; two sets of aligned plates in alternately disposed relation, one set of plates being flat and operating as a unit and the other set of plates including at least four plates being waved and operating as a unit, all of said waved plates being disposed in nested relation to one another so that all undulations therein are axially aligned, said two sets of plates being relatively and coaxially rotatable with respect to one another, said set of flat plates being drive plates and said set of waved plates being driven plates, and pressure means for causing said drive plates to be forced into coextensive engagement with said waved plates whereby the waved plates are flattened.

5. An energy transmitting device, comprising in combination; two sets of aligned plates in alternately disposed relation, one set of plates being flat and operating as a unit and the other set of plates being waved and operating as a unit, all of said waved plates being disposed in nested relation to one another so that all undulations therein are axially aligned, said two sets of plates being relatively and coaxially rotatable with respect to one another, said flat plates being relatively thinner metal and more conformable than said waved plates, and means for compressing said two sets of plates axially for placing in energy transmitting relation with one another.

6. In a clutch pack for use in an automatic transmission comprising a plurality of alternating flat and waved plates wherein all flat plates operate as a unit and all waved plates operate as another unit, all said waved plates being disposed in nested relation to one another so that all undulations therein are axially aligned, said alternate flat and waved plates being relatively rotatable with respect to one another, and said flat plates being relatively thinner than said waved plates and including friction facings on both sides thereof.

References Cited in the file of this patent

UNITED STATES PATENTS

| | | |
|---|---|---|
| 1,340,885 | Fuller | May 25, 1920 |
| 2,376,799 | Miller | May 22, 1945 |
| 2,632,544 | Hockert | Mar. 24, 1953 |
| 2,733,798 | Almen et al. | Feb. 7, 1956 |

FOREIGN PATENTS

| | | |
|---|---|---|
| 447,886 | Great Britain | May 27, 1936 |
| 646,120 | Germany | June 8, 1937 |
| 1,110,183 | France | Oct. 5, 1955 |